Aug. 11, 1970   H. P. M. QUILLERY ET AL   3,523,464
STEERING WHEEL WITH PLASTIC FOAM SHEATHING
Filed April 20, 1967
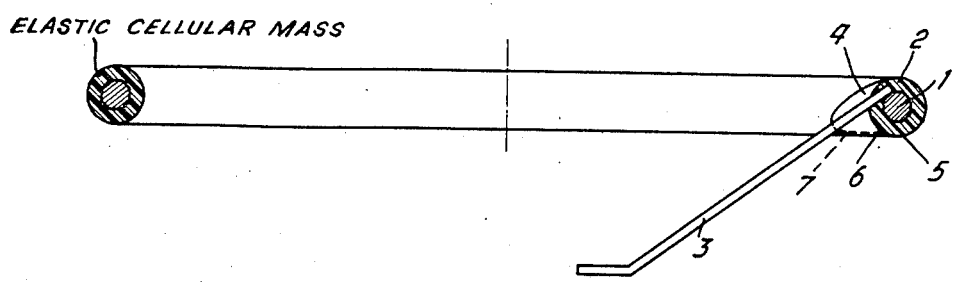
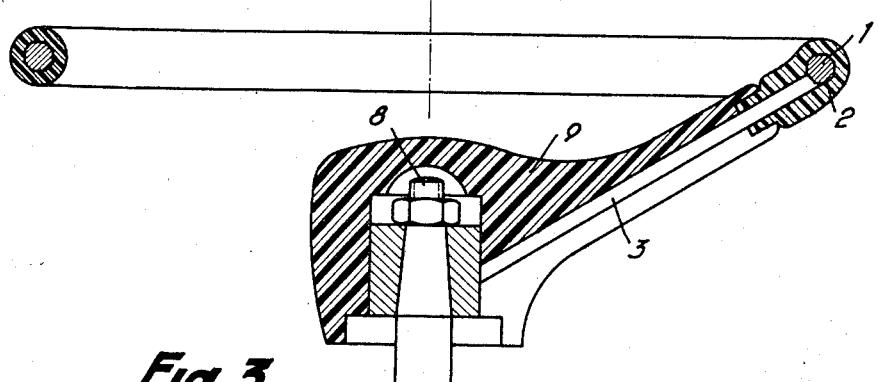
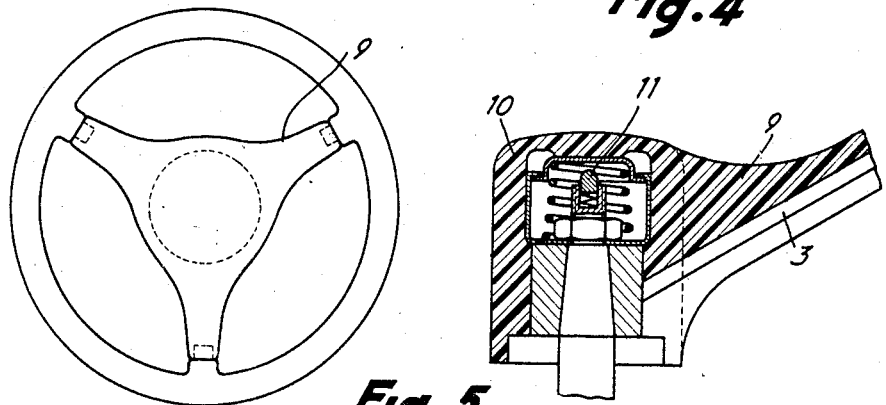
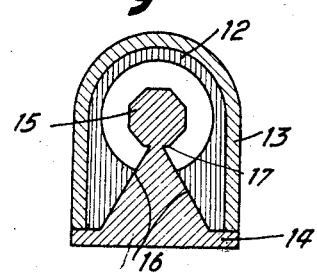

United States Patent Office 3,523,464
Patented Aug. 11, 1970

3,523,464
STEERING WHEEL WITH PLASTIC FOAM SHEATHING
Henri Paul Marcel Quillery, La Garenne-Colombes, and Georges Gonzalez, Paris, France; said Quillery assignor to Societe Quillery, La Garenne-Colombes, Haute-de-Seine, France, a French company
Continuation-in-part of application Ser. No. 619,189, Feb. 28, 1967, which is a continuation-in-part of application Ser. No. 473,838, July 21, 1965. This application Apr. 20, 1967, Ser. No. 632,233
Claims priority, application France, Apr. 26, 1966, 59,079
Int. Cl. B62d 1/04
U.S. Cl. 74—552     3 Claims

ABSTRACT OF THE DISCLOSURE

A steering wheel comprised of a steering wheel hub which supports an overlaying flexible foam material with the foam material having on its surface a non-foam elastomer layer, said foam covered steering wheel acting to protect the user thereof against shocks, vibrations, and the like.

CROSS REFERENCE TO RELATED APPLICATIONS

Pursuant to the benefits accorded by 35 U.S.C., Sections 119 and 120, this application is a continuation-in-part of copending application Ser. No. 619,189 filed Feb. 28, 1967, which latter application is in turn a continuation-in-part of copending application Ser. No. 473,838 filed July 21, 1965, now abandoned; and, said instant application and said copending applications are entitled to the benefit of the priority date of their French filed patent application counterpart.

This invention relates to steering wheels in which at least the rim armature is covered at least to a partial extent with a sheath which constitutes the external gripping surface of the rim.

The invention is directed to the novel industrial product constituted by a steering wheel of this type in which the sheath comprises at the surface a substantially non-expanded elastomer layer which is both compact and impervious and, internally, a flexible and elastic cellular mass forming a protective padding which provides isolation against shocks and vibrations, said mass being secured to said layer. In fact, in addition to the protection which it affords as a shock isolator, a covering of this type has all the properties which are required for its use and, in particular, comfort (pleasant feel, vibration absorption, resilience when handled, thermal isolation), safety (flexibility in the event of accident), attractive design and finish (appearance of leather, wood, fabric and the like). Furthermore, the steering-wheel covering under consideration has the essential property of affording resistance to rubbing and tearing stresses without any danger of stripping or surface breakaway, this result being achieved by virtue of the design thickness of the elastomer layer. In accordance with a further characteristic feature of the invention, the strength of the sheathing material can be enhanced to a still greater extent by molding said sheathing in a single piece throughout its thickness, the cellular mass being joined progressively to said surface by means of a transition zone comprising cells of increasing number and size from the surface towards the interior. The elastomer layer is then effectively bonded to the internal cellular mass. Accordingly, any rubbing or tearing stresses exerted on the surface of the material no longer result in localized stresses in a subjacent junction zone which constitutes a non-continuous interface and consequently a low-resistance zone which is conductive to the inception of tearing and breakaway.

In a particular form of execution, the sheathing extends over the arms and the center or hub of the steering wheel and this portion of the sheath is constituted by a separately molded part which is added and preferably detachable. It is thus possible in particular to produce varied and decorative effects with great ease. It is also possible to provide a central control unit such as a horn within a cavity formed inside the hub and to actuate such a horn despite the presence of the interposed sheathing which is accordingly designed to afford a sufficient degree of flexibility to permit of elastic deformation.

Further properties and advantages attached to the sheathed steering wheel according to the invention will become apparent from the following description of different forms of execution of a steering wheel of this type, reference being made to FIGS. 1 to 5 of the accompanying drawings.

FIG. 1 is a view showing the core and foam covering.
FIG. 2 is a view of the axial cross-section showing central cover.
FIG. 3 is a plan view of the steering wheel.
FIG. 4 is a view of an axial cross-section in another embodiment.
FIG. 5 is a view showing the mold and cradle.

In the example of execution of FIG. 1, only the core 1 of the steering-wheel rim is covered with a foam product sheath 2 having a continuous surface whilst the steering-wheel arms 3 remain visible. However, provision is made in this embodiment for a sheathing element 4 which encases the ends of the arms and which is joined to the rim sheathing 2. The joint lines 5, 6 and 7 are located on the underside of the steering wheel and are therefore less readily visible.

In the example of FIG. 2 (which is a view in axial cross-section) and FIG. 3 (which is a plan view), the foam covering 2 which is molded over the armature is provided only over the rim 1 and a small portion of the arms 3; the major part of said arms and the hub 8 is covered by a molded portion also formed of foam in another mold and subsequently added to the steering wheel.

By virtue of the above solution, the filling of the steering-wheel mold is simplified and the steering-wheel core can be effectively held in position by the arm extremities.

Should the steering wheel be entirely molded including the arms and hub, a central hole can in that case be left for the purpose of accommodating a decorative cap or a horn system, the primary function of said hole being to permit the fixing of the steering wheel from the top end according to conventional practice.

In the example of FIGS. 2 and 4, the steering wheel is also fixed at the top and provision is made for the removable fitting, not only of the central cover but also of the covering 9, 10 which is provided over the arms 3 and hub 8. In this case, the horn contact 11 is closed by elastic deformation of the cover 10, as shown in FIG. 4.

In this case, the foam covering is not molded over the armature but within a mold 12 (as shown in FIG. 5) of elastomer, for example, which is mounted in a cradle 13 and fitted with a cover 14. The shape of said cover is so designed that, on the one hand, a space 15 is provided for the steering-wheel core and that, on the other hand, the width of opening 16 is sufficient to permit the insertion of the portion 15 of the cover which represents the core and, finally, that the width of the portion 17 which provides a junction between said portion 15 and the remainder of the cover 14 is just sufficient to endow said junction portion 17 with the requisite strength.

The sheath which is thus obtained is attached to the steering wheel by flexible engagement.

Even in the case of a single member which serves to cover the arms and the hub, the central horn can be actuated by exerting pressure on the center of the steering wheel by virtue of the flexibility of this portion.

It is apparent that, even in the case of FIGS. 2, 3 and 4, the center of the added member can be open so as to accommodate a cap or horn control unit.

Should it be desired to fit the steering wheel with a contact-ring, it is possible in that case to leave only the circular portion of said ring exposed whilst the remainder, namely the arms and center, are covered with a plastic foam member of suitable shape. In this case, said member can be molded on the ring, but can also be molded separately and mounted on the ring, for example, flexible engagement so that the flexibility and elasticity of said member are thus turned to useful account.

According to an alternative form of execution, it is possible to provide a covering over a portion of the steering wheel such as, for example, the central portion and the arms, with either rigid plastic material or rubber but preferably with thermoplastic material having a polyolefin base whilst another portion such as the rim, for example, is covered with monolithic foam, the molding process being commenced with either one portion or the other. The junction between the two portions can be carried out, for example, by forming in the molding process surface depressions in the form of channels at the end of the first molded portion, for example, whilst the second portion is adapted to cover said surface depressions and become attached thereto. The covering of plastic material or rubber can be employed even on the steering-wheel rim as a layer which is subjacent to the sheating of cellular material having an elastomer surface.

It is apparent that it will be preferable to mold first the rigid portion then the foam portion.

In the case of a composite steering wheel, it will be an advantage to cover the line of separation between the two types of material with a metal strip or with a strip having a metallic appearance. Whether it is molded on the steering wheel itself or added subsequently, the sheathing can advantageously be obtained by means of the process which is described in commonly assigned, copending U.S. application Ser. No. 619,189 of filing date Feb. 28, 1967. The disclosure set forth in said commonly assigned copending application Ser. No. 619,189 is hereby incorporated herein by reference.

From a method aspect the inventive discovery herein comprises the preparation of a steering wheel having a supporting core rim, a hub, at least one spoke-like arm, said rim being covered to a substantial extent with a covering sheath which generally constitutes the external gripping surface of the steering wheel, said sheath being molded in a single piece, in a single shot molding operation, throughout its thickness, said covering sheath being comprised of a substantially non-expanded elastomer plastic skin layer forming the surface of the sheath, said layer being both compact and generally impervious, and an interoir, flexible, elastic, cellular plastic foam, formed of the same plastic as said skin layer, and forming a protective padding which provides isolation against shocks and vibrations, said foam being joined progressively to said elastomer surface layer by progressive transition zone means comprising cells of generally increasing number and size from the elastomer surface layer to the interior of the foam, said means acting to effectively bond the elastomer layer to the interior foam, whereby rubbing or tearing stresses exerted on the surface layer are prevented from resulting in localized stresses in a subjacent zone which would be conducive to inception of tearing and/or breakaway in absence of said progressive transition zone means; and, wherein said method constitutes preparing said steering wheel in the form of a molded product of polyurethane foam structure, by molding a skinned eleastic flexible relatively impermeable polyurethane polymer foam part having good resistance to tear and plastic deformation, a compact outer skin surface and a cellular internal structure and a density no less than about 50 grams per cubic decimeter, said method comprising the steps of: (1) employing long chain polyols having an equivalent weight per active hydrogen of greater than 750, and being present in the formulation in a proportion of about 5% to about 40% on an equivalents basis of the total NCO groups, (2) employing at least one short chain polyfunctional product having at least two active hydrogens and selected from the group consisting of a polyl, a polyamine, an aminated polyol, an amino-alcohol, an amino-acid, an amino-phenol, or water, said short chain product having an equivalent weight per active hydrogen of less than 200, and being present in the formulation in an amount of about 95% to about 60% on an equivalents basis of the total NCO groups, (3) employing a proportion of said water in said short chain product of less than 25% on an equivalents basis, (4) employing a ratio of the long chain polyol constituents to the short chain polyfunctional product such that the equivalent weight of the polyurethane per reactive position between free NCO and active hydrogen groups is between about 200 and about 800, wherein said NCO carrying constituents and the short chain polyfunctional product material are selected such that there are formed bonds between the long chain polyols comprised of at least six nuclei including the nuclei already existing in the long chain polyols, and wherein the equivalent weight of the molded polyurethane is between about 300 and about 800 per nucleus.

The mode of preparing said steering wheels utilizing the method referred to hereinabove is generally carried out by placing a metal insert or metal supporting core into a mold (as shown in FIG. 5) and then molding the polyurethane foam material around the metal insert to form the steering wheel. The molding formulation for the polyurethane material is exemplified in the following set of examples numbered I, II and III hereinbelow taken from applicant's copending application Ser. No. 619,189.

EXAMPLE I

A mixture of 1800 parts (1.2 equivalents) of trioxypropylene-ethylene glycol/trimethylol propane of a molecular weight of 4500 (TPE 4542), 375 parts (2.8 equivalents) of methylene - bis - ortho - chloroaniline (MOCA), 38.25 parts (0.85 equivalent) of 3-amino 2-methyl 1-propanol, 4.5 parts of tin dibutyl dilaurate, 6.60 parts of triethylene diamine, 108 parts of monofluorotrichloromethane, and 14.5 parts of carbon black were prepared at ordinary temperature.

444 parts (5.1 equivalents) of toluylene di-isocyanate 80/20 and 13 parts of silicone SI 202 were added to the above mixture within a very short time and with agitation, whereafter the mixture was immediately poured into a mold at 50 or 60° C., in which it spreads out. The mold was then brought to a temperature of 60, 80 or 100° C. in an oven.

EXAMPLE II

A mixture of 1.25 parts (0.75 equivalent) of trioxypropylene ethylene glycol/glycerine of a molecular weight of 4500 (TPE 4542), 402 parts (3 equivalents) of methylene-bis-ortho-chloroaniline (MOCA), 9.9 parts (1.1 equivalents) of water, 4.6 parts of tin dibutyl dilaurate, 3.1 parts of triethylene diamine—the latter two compounds being used as conventional foaming and cross-linking catalyst—and 9.8 parts of the "Dow Corning 199" silicone surface-active agent was prepared at ordinary temperature.

4.22 parts (4.85 equivalents) of toluylene di-isocyanate 80/20 was added within a very brief period and with agitation to the above mixture whereafter the resultant foaming mixture was immediately poured into a mold at a temperature between 50–60° C. if it is required to have a surface coating, at 100 or 120° C. if no such skin is required. The mold was then heated in an oven, the temperature ranging from 60 to 120° C.

EXAMPLE III

A mixture of 150 parts (0.1 equivalent) of trioxypropylene - ethylene - glycol/glycerine, of a molecular weight of 4500 (TPE 4542), 617 parts (0.617 equivalent) of trioxypropylene ethylene glycol/glycerine of a molecular weight of 3,000, 172.8 parts (1.29 equivalents) of methylene-bis-ortho-chloroaniline, 10 parts (1.1 equivalents) of water, 1.2 parts of the silicone surface-active agent DC 199, 1.42 parts of triethylene diamine, 2.84 parts of tin octoate and 0.474 part of tetramethylbutane diamine was prepared at ordinary temperature.

269.2 parts (3 equivalents) of toluylene di-isocyanate were added to the above mixture, whereupon the foaming mixture was poured into a mold at 50 or 60° C., which is then heated between 60 and 100° C.

What is claimed is:

1. A steering wheel having a rim core, a hub, and arms at least said rim core being covered at least to a partial extent with a sheath which constitutes the external gripping surface of the rim, said sheath comprising at the surface a substantially non-expanded elastomer layer which is both compact and impervious and, internally, a flexible and elastic cellular mass forming a protective padding which provides isolation against shocks and vibrations, said mass being secured to said layer, and said steering wheel being further characterized in that said rim sheath is provided with appendages which extend to the arms extremities of the steering-wheel core and cover said extremities, said appendages of the rim sheath are covered by the extremities of the removable arm-sheath.

2. A steering wheel having a rim core, a hub, and arms at least said rim core being covered at least to a partial extent with a sheath which constitutes the external gripping surface of the rim, said sheath comprising at the surface a substantially non-expanded elastomer layer which is both compact and impervious and, internally, a flexible and elastic cellular mass forming a protective padding which provides isolation against shocks and vibrations, said mass being secured to said layer, and said steering wheel being further characterized in that said arms and said hub are sheathed in a manner known per se with a covering of thermoplastic material which is molded over the steering-wheel core, said rim sheath has appendages which extend to the arm extremities of the steering wheel and cover the plastic layer at said extremities.

3. A steering wheel having:
a supporting core rim,
a hub,
at least one spoke-like arm,
said rim being covered to a substantial extent with a covering sheath which generally constitutes the external gripping surface of the steering wheel,
said sheath being molded, in a single shot molding operation, throughout its thickness,
said covering sheath being comprised of
a substantially non-expanded polyurethane elastomer skin layer forming the surface of the sheath, said layer being both compact and generally impervious, and
an interior, flexible, elastic, cellular polyurethane foam, formed of the same material as said skin layer, and forming a protective padding which provides isolation against shocks and vibrations,
said foam being joined progressively to said polyurethane elastomer surface layer by
progressive transition zone means comprising cells of generally increasing number and size from the elastomer surface layer to the interior of the polyurethane foam, said means acting to effectively bond the elastomer layer to the interior foam, whereby rubbing or tearing stresses exerted on the surface layer are prevented from resulting in localized stresses in a subjacent zone which would be conducive to inception of tearing and/or breakaway in absence of said progressive transition zone means.

References Cited

UNITED STATES PATENTS

| | | | |
|---|---|---|---|
| 3,166,332 | 1/1965 | Olson | 264—48 |
| 3,099,516 | 7/1963 | Henrickson | 264—48 |
| 3,175,863 | 3/1965 | Hood | 264—48 |
| 3,319,376 | 5/1967 | Doppelt et al. | 264—48 |
| 2,103,003 | 12/1937 | Fischer | 264—54 |
| 2,381,380 | 8/1945 | Carter | 264—48 |
| 2,829,212 | 4/1958 | Cislo | 74—552 |
| 3,364,785 | 1/1968 | Geller | 74—552 |

FOREIGN PATENTS 1,330,877  5/1963  France.

OTHER REFERENCES

Modern Plastics Encyclopedia, 1965, vol. 42, No. 1A, p. 27.

FRED C. MATTERN, JR., Primary Examiner

W. S. RATLIFF, JR., Assistant Examiner

U.S. Cl. X.R.

264—48

REEXAMINATION CERTIFICATE (327th)

United States Patent [19]
Quillery et al.

[11] B1 3,523,464
[45] Certificate Issued Apr. 2, 1985

[54] STEERING WHEEL WITH PLASTIC FOAM SHEATHING

[75] Inventors: Henri P. M. Quillery, La Garenne-Colombes, France; Georges Gonzalez, 10 rue de Bellechasse, Paris, both of France

[73] Assignee: Societe Quillery, La Garenne-Colombes, France; part interest

Reexamination Request:
No. 90/000,448, Sep. 22, 1983

Reexamination Certificate for:
Patent No.: 3,523,464
Issued: Aug. 11, 1970
Appl. No.: 632,233
Filed: Apr. 20, 1967

Related U.S. Application Data

[63] Continuation-in-part of Ser. No. 619,189, Feb. 28, 1967, which is a continuation-in-part of Ser. No. 473,838, Jul. 21, 1965.

[30] Foreign Application Priority Data

Apr. 26, 1966 [FR] France .................................. 59.079

[51] Int. Cl.³ ............................................. B62D 1/04
[52] U.S. Cl. ............................... 74/552; 264/48
[58] Field of Search .................................... 74/552

[56] References Cited

U.S. PATENT DOCUMENTS

| | | | |
|---|---|---|---|
| 2,103,003 | 12/1937 | Fischer | 264/54 |
| 2,381,380 | 8/1945 | Carter | 264/48 |
| 2,829,212 | 4/1958 | Cislo | 74/552 |
| 2,850,464 | 9/1958 | Mitchell | |
| 3,029,208 | 4/1962 | Khawam | 521/167 |
| 3,067,148 | 12/1962 | Sandridge et al. | |
| 3,072,582 | 1/1963 | Frost | |
| 3,099,516 | 7/1963 | Hendrickson | 264/48 |
| 3,112,281 | 11/1963 | Gromacki et al. | |
| 3,127,457 | 3/1964 | DiPinto | |
| 3,166,332 | 1/1965 | Olson | 264/46 |
| 3,175,863 | 3/1965 | Hood | 264/48 |
| 3,188,302 | 6/1965 | Lorenz | 260/77.5 |
| 3,319,376 | 5/1967 | Doppelt et al. | 264/48 |
| 3,364,785 | 1/1968 | Gelles | 74/552 |

FOREIGN PATENT DOCUMENTS

| | | |
|---|---|---|
| 666673 | 11/1965 | Belgium |
| 666674 | 11/1965 | Belgium |
| 851851 | 10/1952 | Fed. Rep. of Germany |
| 1440710 | 4/1966 | France |
| 1448751 | 7/1966 | France |
| 719698 | | Italy |
| 728734 | | Italy |
| 6509819 | 2/1966 | Netherlands |
| 6509855 | 2/1966 | Netherlands |
| 316001 | | Spain |

OTHER PUBLICATIONS

"Rubber World", article by Kane, (Feb. 1963), pp. 35–39.
Wyandotte Technical Bulletin NPD-U6, Apr. 1, 1963.

*Primary Examiner*—Kenneth J. Dorner

[57] ABSTRACT

A steering wheel comprised of a steering wheel hub which supports an overlaying flexible foam material with the foam material having on its surface a non-foam elastomer layer, said foam covered steering wheel acting to protect the user thereof against shocks, vibrations, and the like.

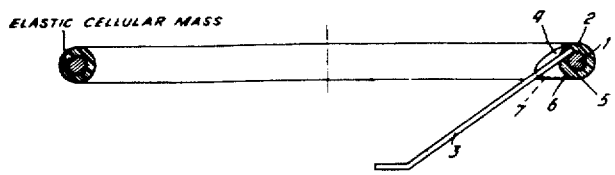

REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1 and 2 is confirmed.

Claim 3 is cancelled.

* * * * *